F. HORN.
VALVE CASING AND PIPE CONNECTION.
APPLICATION FILED MAY 21, 1910.

975,429.

Patented Nov. 15, 1910.

Witnesses
E. B. Maurer
A. L. Phelps

Inventor
Frank Horn

By C. C. Shepherd
Attorney

UNITED STATES PATENT OFFICE.

FRANK HORN, OF COLUMBUS, OHIO, ASSIGNOR OF ONE-HALF TO W. C. ALTHEN, OF COLUMBUS, OHIO.

VALVE-CASING AND PIPE CONNECTION.

975,429.   Specification of Letters Patent.   Patented Nov. 15, 1910.

Application filed May 21, 1910. Serial No. 562,564.

*To all whom it may concern:*

Be it known that I, FRANK HORN, a citizen of the United States, residing at Columbus, in the county of Franklin and State of Ohio, have invented certain new and useful Improvements in Valve-Casing and Pipe Connections, of which the following is a specification.

My invention relates to the improvement of valve casing and pipe connections, and while my invention has particular relation to connections of this class between angle cocks, cut off valves, etc., such as are ordinarily used in connection with air brake mechanism on cars, it will be obvious that the said invention will apply to other valve casing and pipe connections.

The objects of my invention are to provide in conjunction with the usual internally threaded end portion of a valve casing, improved means for bracing and protecting the externally threaded end portion of a pipe connected with said casing, whereby the tendency of the pipe to break at the points of its connection with the casing through strain or shock, is obviated or reduced to a minimum, and to provide such a brace or protecting means of simple and inexpensive construction. These objects I accomplish in the manner illustrated in the accompanying drawing, in which—

Figure 1:
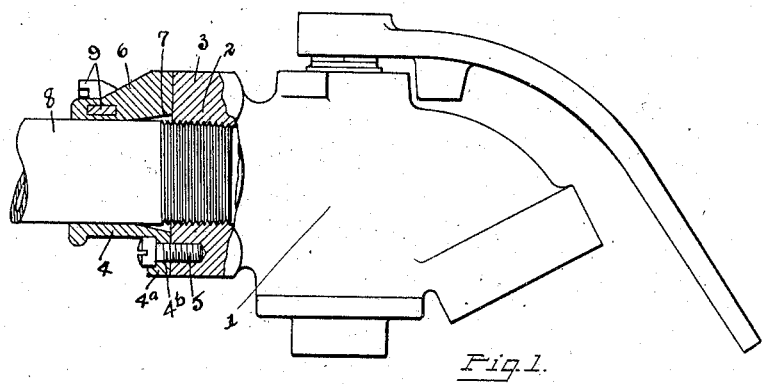
Figure 2:
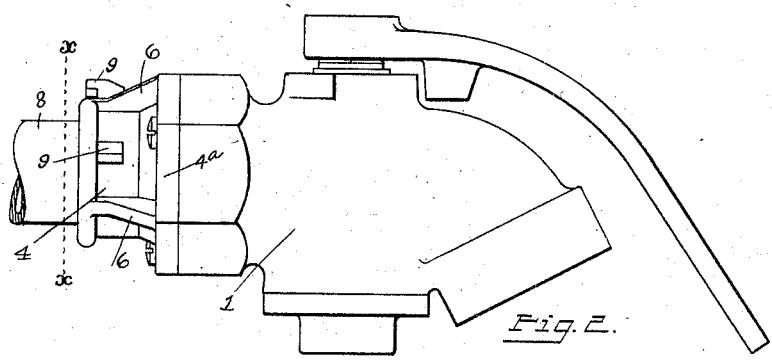
Figure 3:
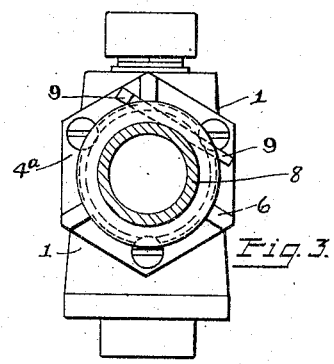

Figure 1 is a partial side elevation and partial sectional view of a train line angle cock, showing my improved brace in connection therewith, Fig. 2 is a similar view wholly in elevation, and, Fig. 3 is a transverse section on line $x$—$x$ of Fig. 2.

Similar numerals refer to similar parts throughout the several views.

While it will be obvious that my invention is adapted for use in connection with other valve casings, stop cocks, cut offs or fittings, I have, for the purpose of illustrating my invention, shown it in connection with an angle cock, the body or casing of which is indicated at 1.

2 represents one of the internally threaded air inlet or outlet openings of the valve or angle cock casing, which is formed with the usual external flange or enlargement 3.

4 represents a tubular brace or protecting member, which in the present instance, is shown as formed separately from the body of the casing 1, but which as is evident, may be formed integral with said casing. In the construction shown, however, the inner end of the member 4, is formed with an outturned portion or portions 4$^a$ through which are formed openings 4$^b$ to permit the insertion therethrough of the threaded stems of suitable forms of attaching screws 5, the latter being adapted to be screwed into threaded openings formed in the valve casing end enlargement 3. The tubular extension thus provided for the valve casing, may be externally ribbed or braced as indicated at 6, for the purpose of imparting desirable strength thereto.

The inner portion of the central bore or opening of the extension 4, is formed with a slightly flaring enlargement 7, the diameter of said central opening thus being greater at its inner end than the diameter of the threaded central opening of the valve casing member 2 and greater than the circumference of the pipe 8, the threaded end portion of which is adapted to be screwed into said member 2 and to pass through the extension 4. The size of the outer portion of the central opening of the member 4, is however, such as to admit of the pipe 8 being easily slidable therethrough and in order to insure a desirable binding action of the pipe 8 with the extension 4, I provide a slightly tapering key 9 which is adapted, as shown, to be driven through an inclined or diagonal key-way formed in the body of the extension 4, the central line of which is substantially tangent with the inner surface of the central opening of said member 4. The key-way thus formed, slightly intersects the central opening of the member 4 so that when the key is thus driven into said keyway, it comes into binding contact with the periphery of the pipe 8 and serves to clamp the latter into connection with the extension.

It is well known that where threaded connections are effected between train line pipes and valve or cut-off casings or other similar fittings, considerable difficulty has been experienced in preventing the breaking of the pipes and stripping of the threads thereof at their points of connection with such valve casings, owing to the vibration, strain or shock incident to the running and stopping and starting of a train. By my construction, it is obvious that the extension or bracket 4, not only forms a bearing for the unthreaded end portion of the attaching pipe, but serves to brace said pipe in such manner, as to relieve its threaded portion from the strain or shock above set forth. It will also be understood that by the employment of the locking key herein described, any tendency of an independent rotation of either the connecting pipe or valve casing body, is obviated. The provision of the recess or internal enlargement 7 of the central bore of the member 4, provides space for those threads of the pipe 8 which may not be in engagement with the internal threads of the member 2 and which threads may be of slightly greater circumference than the plane body of said pipe. It will be readily understood that where the extension or protecting bracket, is formed separate from the body of the valve casing, it may be readily attached to the ordinary valve casing end, the only labor or expense incurred in forming such attachment, being the necessity of producing the screw holes in the enlargement or head 3.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What I claim, is—

1. In a device of the character described, the combination with a valve casing having an internally threaded pipe attachment opening, of an unthreaded tubular member carried by the casing at the outer end of said internally threaded opening.

2. In a device of the character described, the combination with a valve casing having an internally threaded pipe attachment opening, of an unthreaded tubular member carried by the casing at the outer end of said internally threaded opening and having the inner portion of its central bore enlarged.

3. In a device of the character described, the combination with a valve casing having an internally threaded pipe attachment opening, of an unthreaded tubular member projecting from about the outer end of said internally threaded opening, a pipe passing through said tubular member and having its threaded terminal portion screwed into said pipe attachment opening, and means for locking the unthreaded portion of said pipe into engagement with said tubular member.

4. In a device of the character described, the combination with a valve casing body having an internally threaded pipe attachment opening, of a tubular bracket detachably connected with the valve casing body and extending from about the threaded pipe attachment opening of the latter, said tubular bracket having a key-way communicating with the central bore thereof, and a key adapted to be driven into said key-way and frictionally engage the periphery of the pipe passing through said bracket and engaging said valve casing.

5. The combination with a valve casing having a pipe attaching member, a bracket provided with a flange adapted to bear against the adjacent end of the pipe attaching member, said bracket having a pipe bore therethrough, and means for rigidly connecting the bracket to the pipe attaching member of the casing.

6. The combination with a valve casing having a pipe attaching member extending therefrom, a tubular pipe bracket carried by the pipe attaching member, and means for locking a pipe to the tubular bracket.

In testimony whereof I affix my signature in presence of two witnesses.

FRANK HORN.

Witnesses:
A. L. PHELPS,
E. B. MAURER.